United States Patent
Fukuda

(10) Patent No.: US 7,424,681 B2
(45) Date of Patent: Sep. 9, 2008

(54) FILE DELIVERY SYSTEM AND METHOD FOR DELIVERING FILE OF STYLE DEPENDING ON REQUEST OF EACH USER TERMINAL

(75) Inventor: Kenji Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 484 days.

(21) Appl. No.: 10/053,626

(22) Filed: Jan. 24, 2002

(65) Prior Publication Data

US 2002/0097263 A1 Jul. 25, 2002

(30) Foreign Application Priority Data

Jan. 25, 2001 (JP) .............................. 2001-017119

(51) Int. Cl.
*G06F 3/00* (2006.01)
(52) U.S. Cl. ..................... 715/744; 715/745; 715/747
(58) Field of Classification Search ................ 345/719; 707/10; 715/744–745, 747–749, 733, 738–739; 709/217, 203
See application file for complete search history.

(56) References Cited

U.S. PATENT DOCUMENTS

| 6,006,231 | A  | * | 12/1999 | Popa ......................... 707/10 X |
| 6,167,442 | A  | * | 12/2000 | Sutherland et al. .......... 709/217 |
| 6,370,688 | B1 | * | 4/2002  | Hejna, Jr. .................... 725/101 |
| 6,496,932 | B1 | * | 12/2002 | Trieger ........................ 713/168 |
| 6,526,434 | B1 | * | 2/2003  | Carlson et al. .............. 709/203 |
| 6,591,289 | B1 | * | 7/2003  | Britton ........................ 709/203 |
| 6,615,213 | B1 | * | 9/2003  | Johnson ....................... 707/10 |
| 6,618,360 | B1 | * | 9/2003  | Scoville et al. .............. 370/248 |
| 7,072,932 | B1 | * | 7/2006  | Stahl ........................... 709/203 |
| 2001/0009008 | A1 | * | 7/2001 | Ovadya et al. ................ 707/10 |

FOREIGN PATENT DOCUMENTS

| EP | 1271365 A1 | * | 1/2003 |
| JP | 10-260821  |   | 9/1998 |
| JP | 11-73295   |   | 3/1999 |

\* cited by examiner

*Primary Examiner*—Sy D Luu
(74) *Attorney, Agent, or Firm*—Young & Thompson

(57) ABSTRACT

In a network connecting a server and a plurality of user terminals, each of the user terminals transmits display style information to the server, the display style information specifying a display style of a file to be received from the server. The server receives the display style information from the user terminal and distributes a file of a display style in accordance with the display style information to the user terminals. Moreover, the server gives an identification number to each of the user terminals and holds display style information corresponding to each identification number. The server finds out display style information desired by the user terminal based on the identification number and distributes a file of the desired style to the user terminal. Otherwise, the user terminals store display style information and transmit the display style information to the server on an access to the server. On receiving the access from the user terminal, the server always distributes a file of a style in accordance with the display style information accompanied with the access to the user terminal.

12 Claims, 8 Drawing Sheets

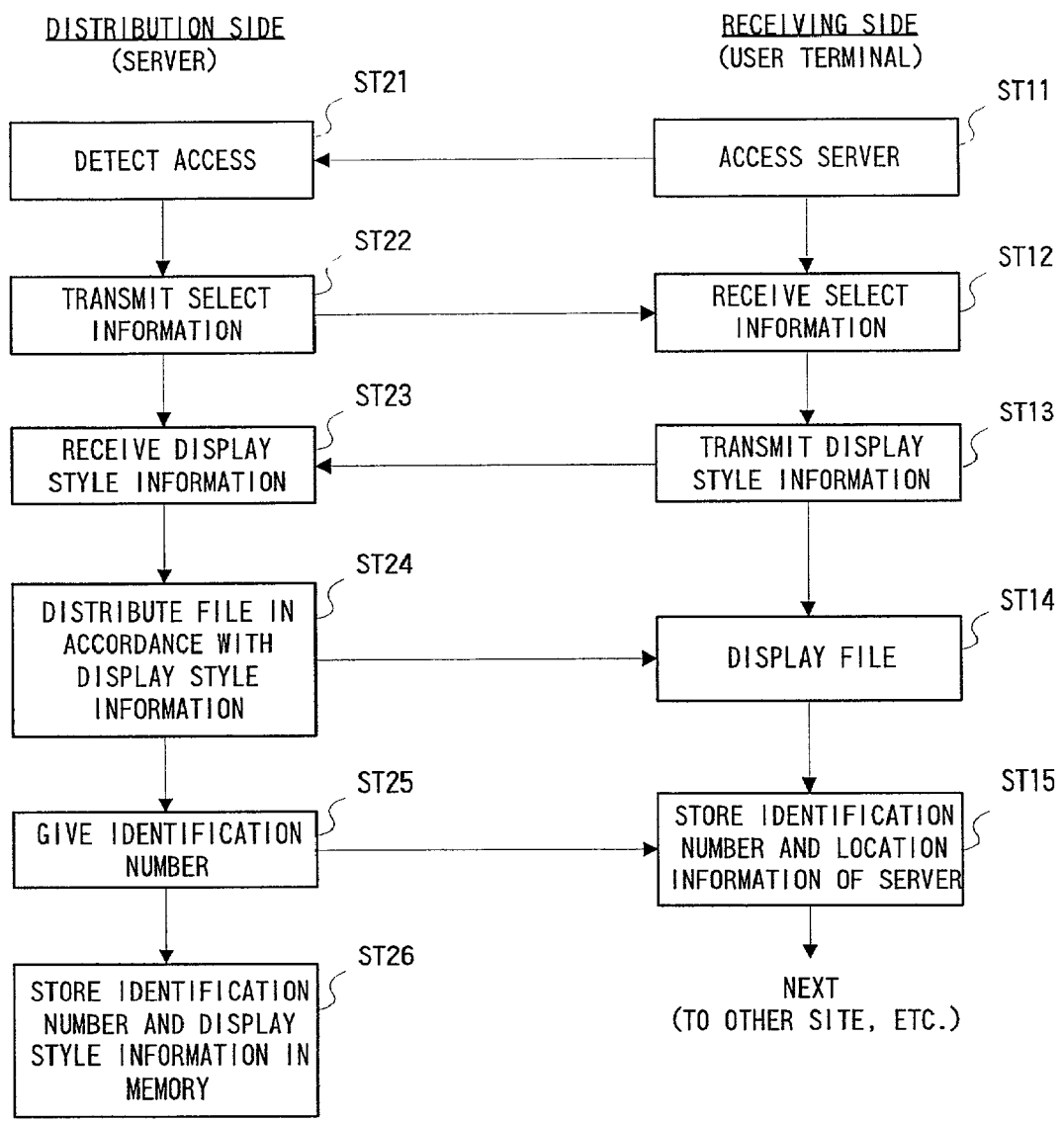

FILE DELIVERY SYSTEM AND METHOD FOR DELIVERING FILE OF STYLE DEPENDING ON REQUEST OF EACH USER TERMINAL

BACKGROUND OF THE INVENTION

The present invention relates to a system which delivers a file on a network, and particularly relates to a file delivery system and method for delivering a file with changing a display style of the file depending on a function of a receiving terminal and a situation of a viewer.

Files which are delivered on networks including the Internet have been heretofore prepared and delivered without particularly concerning about display functions of terminals on the receiving sides and situations of viewers. Namely, each file is delivered by determining a display resolution, colors and the like on the assumption that the terminals on the receiving sides can display the file in a predetermined style.

Recently, files delivered through networks are received by devices having various levels of graphics functions, such as game machines and mobile phones. However, the files delivered on networks cannot be displayed on screens sometimes, or even if the contents can be displayed, the displayed files are difficult to be read, depending on conditions of receiving sides (display functions of terminals and situations of viewers). It is because the files are prepared without taking display functions of receiving terminals or visually handicapped viewers into consideration. For example, color-blind persons are difficult to read screen displays depending on some coloration.

It becomes a significant obstacle to supply equal services to users that such files are delivered from public Web servers or the like.

SUMMARY OF THE INVENTION

An object of the present invention is to provide a file distribution system and method for distributing a file changed in a display style (presence or size of an image, display resolution, color combination or the like) in accordance with a display function of a user terminal on a receiving side or a situation of a viewer (user). According to the present invention, all persons can equally obtain information in a style suitable for each environment.

The file distribution system of the present invention includes a server connected to a network and a plurality of user terminals accessible to the server via the network. Each of the user terminals transmits display style information to the server, the display style information specifying a display style of a file to be distributed from the server. The server receives the display style information from each of the user terminals and distributes a file in accordance with the display style information to each of the user terminals.

A user can select a display style of a file to be delivered in accordance with a situation of the terminal in use or the user. Moreover, once the display style of the file to be distributed is selected in the user terminal, the file of a desired display style can be automatically selected and delivered on accesses to the server at the next time and after.

BRIEF DESCRIPTION OF THE DRAWINGS

These and other objects, features and advantages of the invention will become more fully apparent from the following detailed description taken in conjunction with accompanying drawings.

FIG. 2 is a flowchart showing an operation of a first time delivery of a first embodiment;

FIG. 3 is a view showing display style information stored in a memory of a server;

DESCRIPTION OF THE PREFERRED EMBODIMENTS

Figure 1:
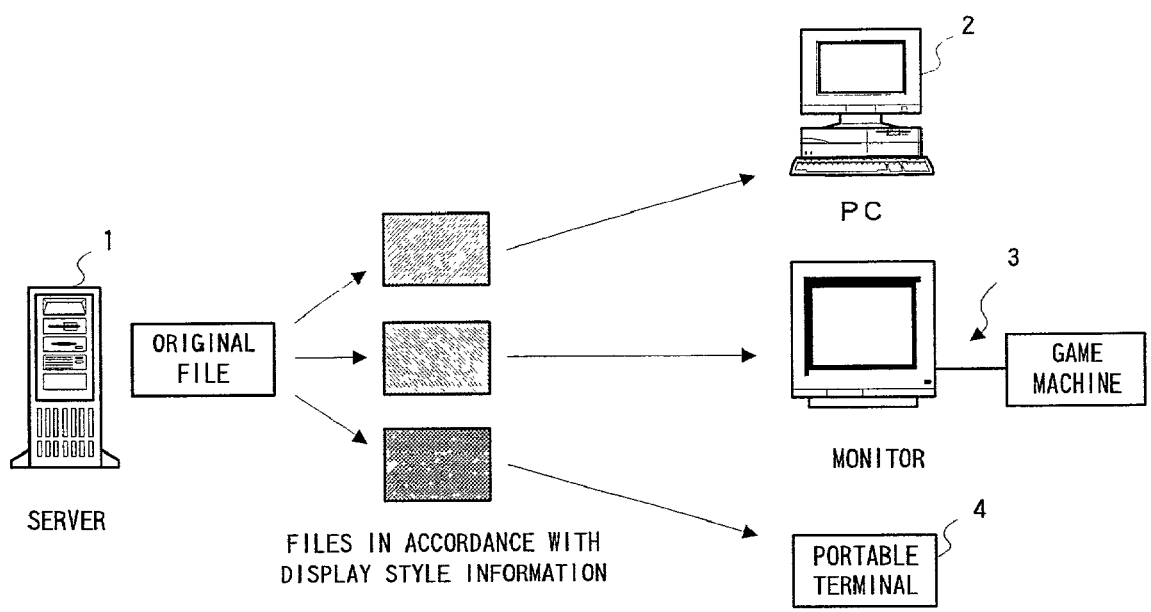
FIG. 1 is a view showing a structure of a file delivery system in an embodiment according to the present invention.

With reference to FIG. 1, a server 1 on a delivering side changes a display style (presence or size of an image, display resolution, color combination or the like) of a file to be delivered, depending on a kind of a user terminal (personal computer (PC) 2, game machine 3, portable terminal 4 or the like) on a receiving side. On the other hand, each of the user terminals 2 to 4 makes a request to the sever 1 for selection of the display style of the file.

For browsing a file, first, each of the user terminals 2 to 4 selects and sets a display style of which a screen of the user terminal can display the file. Thus, in browsing the file at the next time and after, the file having the selected display style is automatically delivered to each of the user terminals 2 to 4. Each of the user terminals 2 to 4 records the selected display style in each user terminal and transmits the contents thereof to the server 1 when the user terminal access the server 1 at second time and after, for example, by utilizing a cookie incorporated in a browser.

First, as shown in FIG. 2, a URL (Uniform Resource Locator), that is, a site identification number of a homepage desired to browse is inputted in user terminals (PC 2, game machine 3, portable terminal 4 or the like) on the receiving side. The user terminal, which is inputted the URL, makes an access to the homepage in the server on the delivering side (ST11). When the server 1 receives the access (ST21), the server 1 delivers select information to the user terminal (ST22). The user terminal receives the select information and displays the select menu on its display (ST12). The selection information is desired to have a simple structure so as to be displayed on any terminals 2 to 4. Subsequently, the user selects a desirable display style of a screen in a selection menu displayed in the user terminal, and the user terminal transmits the selected display style as display style information to the server 1 (ST13). Here, as a method of selecting the display style, an existing method such as pull-down menus, radio buttons and check boxes may be optionally used, and the method may not be limited. The contents of the display style to be selected are related to a style of display such as the presence of an image, a size of the image and a color combination for use. Otherwise, each of the user terminals 2 to 4 may not receive a file of such select information from the server 1 but may previously store a file for selection of display style in a memory of the each user terminal. In this case, the user may previously set the display style information on the each of the user terminals, and the display style information may be transmitted by a transmitter to the server 1 when the user terminals access the server 1.

The server 1 receives the display style information from each of the user terminals 2 to 4 (ST23), and delivers the file of the display style (the presence or the size of the image, the display resolution, the color combination or the like) in accordance with each display style information to each of the user terminals (ST24).

Each of the user terminals 2 to 4 receives the file from the server 1, and displays a screen in the selected display style (ST14)

The server 1 delivers an identification number to each of the user terminals 2 to 4 to which the file is delivered (ST25), while storing the display style information selected by the user terminal and the delivered identification number as shown in FIG. 3 in a memory 5 (ST26). When each of the user terminals 2 to 4 receives the identification number, each of the user terminals 2 to 4 holds the URL of the server 1 and the delivered identification number in a memory thereof (ST15), for example, by using a cookie incorporated in a browser.

Figure 4:
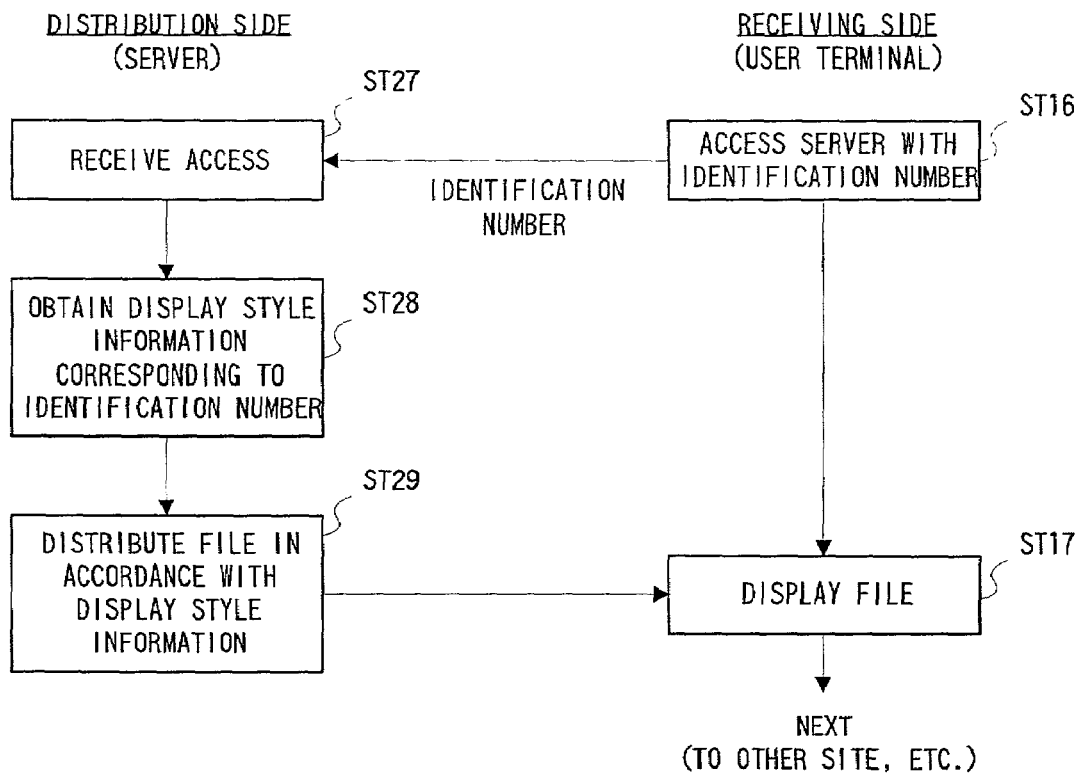
FIG. 4 is a flowchart showing operations of delivery at a second time and after in the first embodiment.

Next, description will be made on deliveries at the second time and after with reference to FIG. 4. When the user inputs the URL of the homepage previously accessed with each of the user terminals 2 to 4, the user terminal inputted the URL automatically transmits the identification number to the server 1 (ST16), and the access to the server 1 is started (ST27). On receiving an access request from the user terminal, the server 1 refers display style information corresponding to the received identification number and obtains a file of the display style from the memory 5 (ST28). Then, the server 1 delivers a file having a style in accordance with the obtained display style information to the user terminal (ST29). The user terminal can obtain the file having the selected display style in this manner and carries out a screen display (ST17). Therefore, when each of the user terminals 2 to 4 registers display style information on the server 1 and obtains the identification number on the first access, the terminals can automatically obtain the file having the desired display style without again selecting the display style at the next access and after.

The server 1 will be further described in detail. Regarding to the structure and the operation of the server, the following examples can be conceived.

Figure 5:
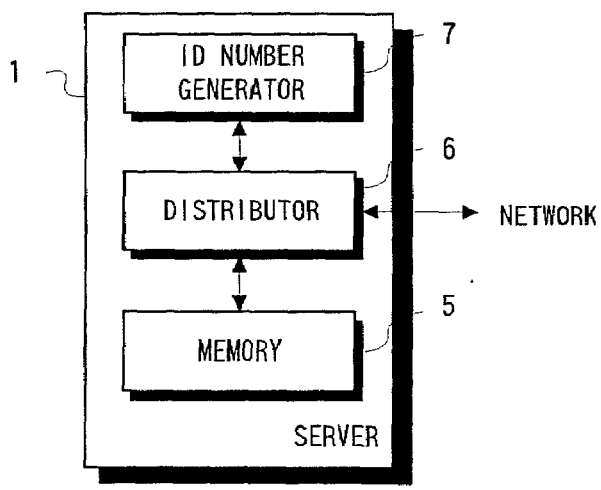
FIG. 5 is a view showing a structure of the server.

(1) With reference to FIG. 5, the server 1 includes a memory 5, a distributor 6 and an identification number generator 7. The memory 5 beforehand holds files of various display styles in accordance with the selected conditions. Referring to FIG., 6, the operations of the server 1 will be shown. When the server 1 receives an access from the user terminals 2 to 4 (ST31), the server 1 determines whether or not the access is accompanied with the identification number (ST32). In the case of the access accompanied with no identification number, the distributor 6 delivers the select information to the user terminal (ST33). When the display style information specified by each of the user terminals 2 to 4 is received from the user terminal (ST34), the distributor 6 obtains a file of a display style in accordance with the display style information from the user terminal (ST35) and transmits the file to the user terminal (ST36). Moreover, the identification number generator 7 generates an identification number and the distributor 6 gives the user terminal the identification number (ST37), and the server 1 stores the given identification number with the display style information transmitted from the user terminal in the memory 5 (ST38). In the case that the access from each of the user terminals 2 to 4 is accompanied with the identification number, the distributor 6 reads out display style information corresponding to the identification number from the memory 5 (ST39). The distributor 6 selects a file of a display style in accordance with the display style information from the memory 5 (ST35), and transmits the file to the user terminal (ST36) In this example, the memory 5 holds a correspondence table of the identification numbers and the display style information, and a plurality of file shaving different display styles. However, there is no problem when the files and the table are held in separate memories.

Figure 6:
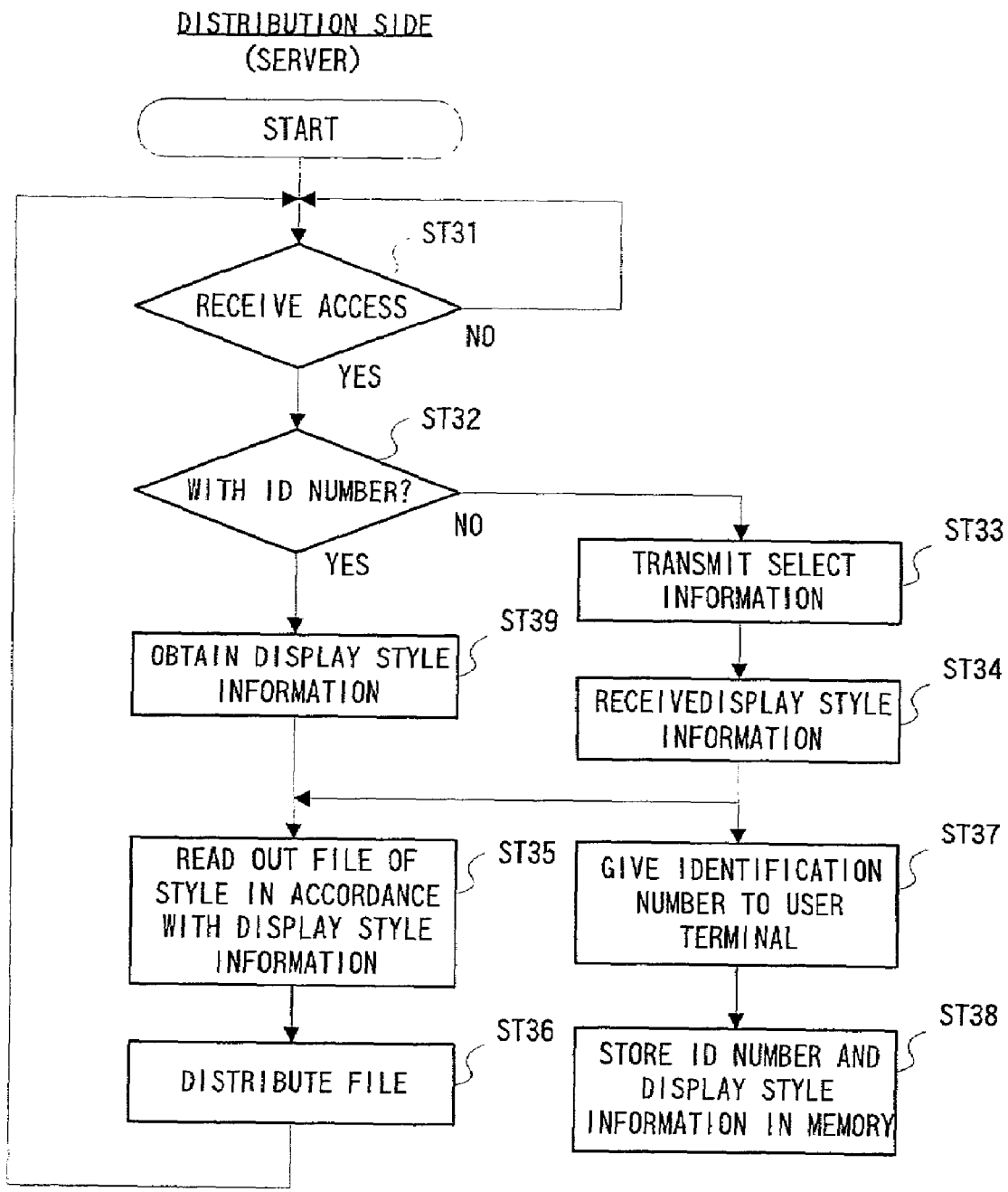
FIG. 6 is a flowchart showing an operation of the server.
Figure 7:
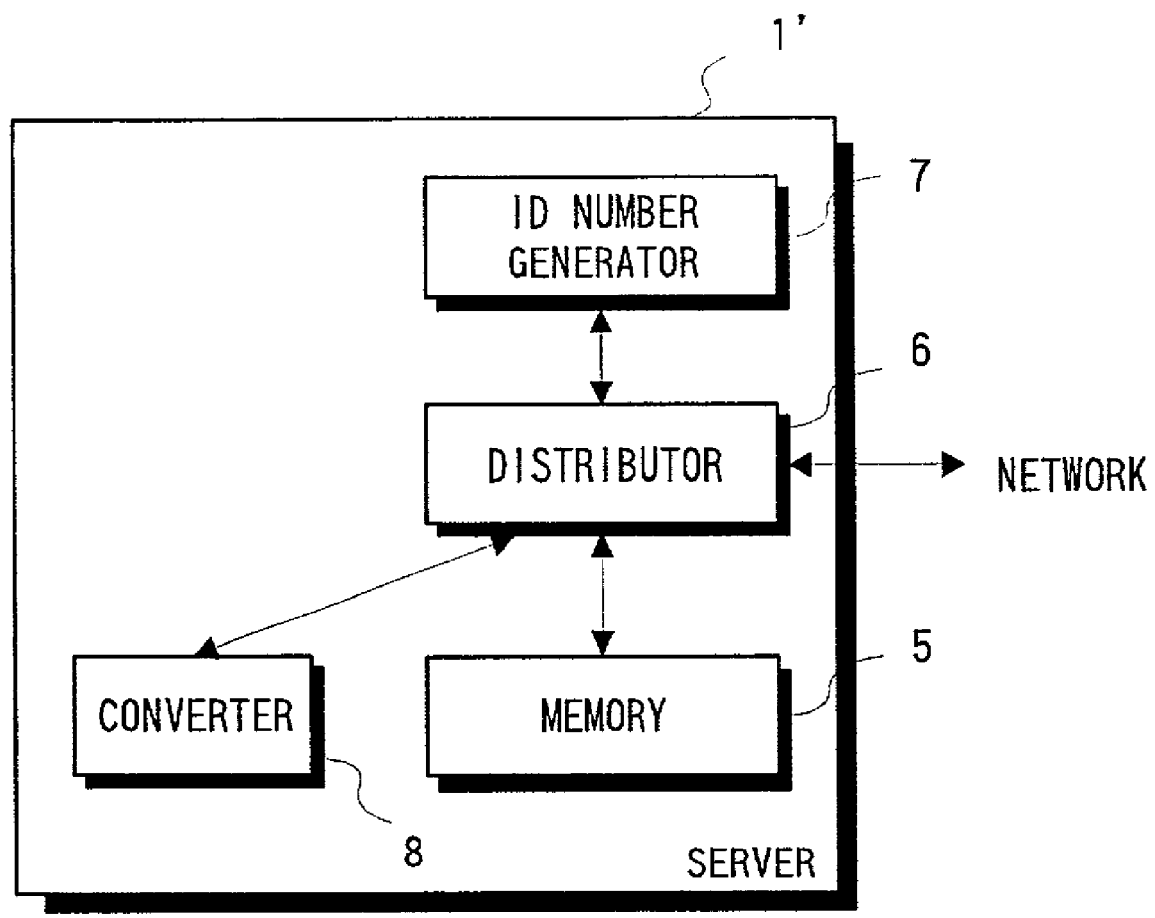
FIG. 7 is a view showing another structure of the server.
Figure 8:
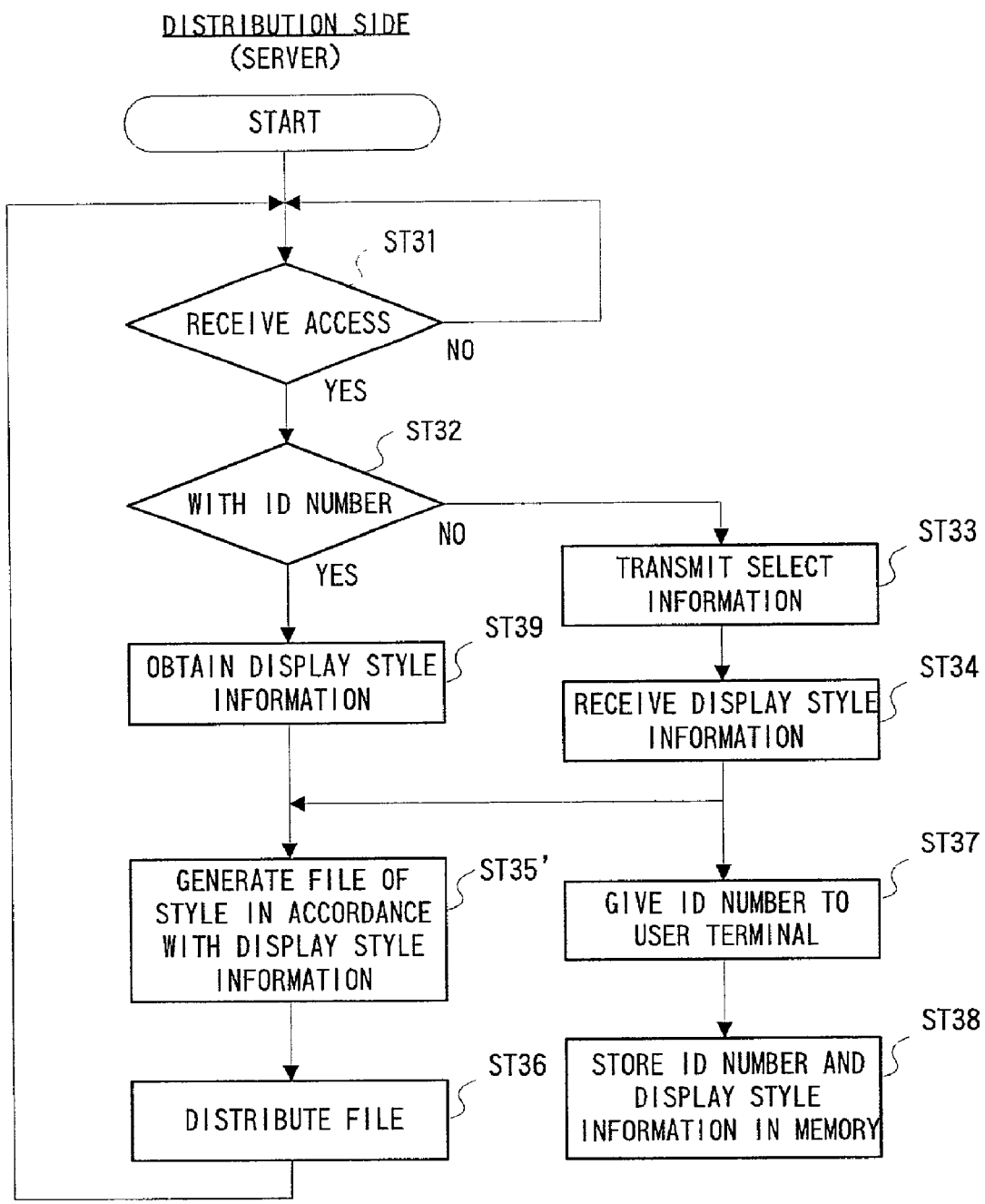
FIG. 8 is a flowchart showing an operation of the server.

(2) With reference to FIG. 7, the server 1' further includes a converter 8 which changes the display style of a file in various styles in addition to the above-mentioned example (1). Basic operations are similar to those described in example (1). The memory 5 holds only an original file of a file to be transferred to the user terminals. With reference to FIG. 8, this example is different from the above-mentioned example (1) in that the converter 8 generates a file of a desired display style from the original file in accordance with the display style information (ST35') instead of ST35 in FIG. 6.

When the user desires to change the display style information at the second access and after, a changing function may be provided on a homepage provided by the server. Each of the user terminals 2 to 4 again obtains the select information from the server 1 and transmits new display style information with the identification number to the server 1. The server 1 changes the information of the table in FIG. 3 in accordance with the new display style information. The changing method is not limited to such method, and may be carried out in a similar manner to a method generally used for changing a password.

Next, description will be made on operations of a second embodiment according to the present invention.

Figure 9:
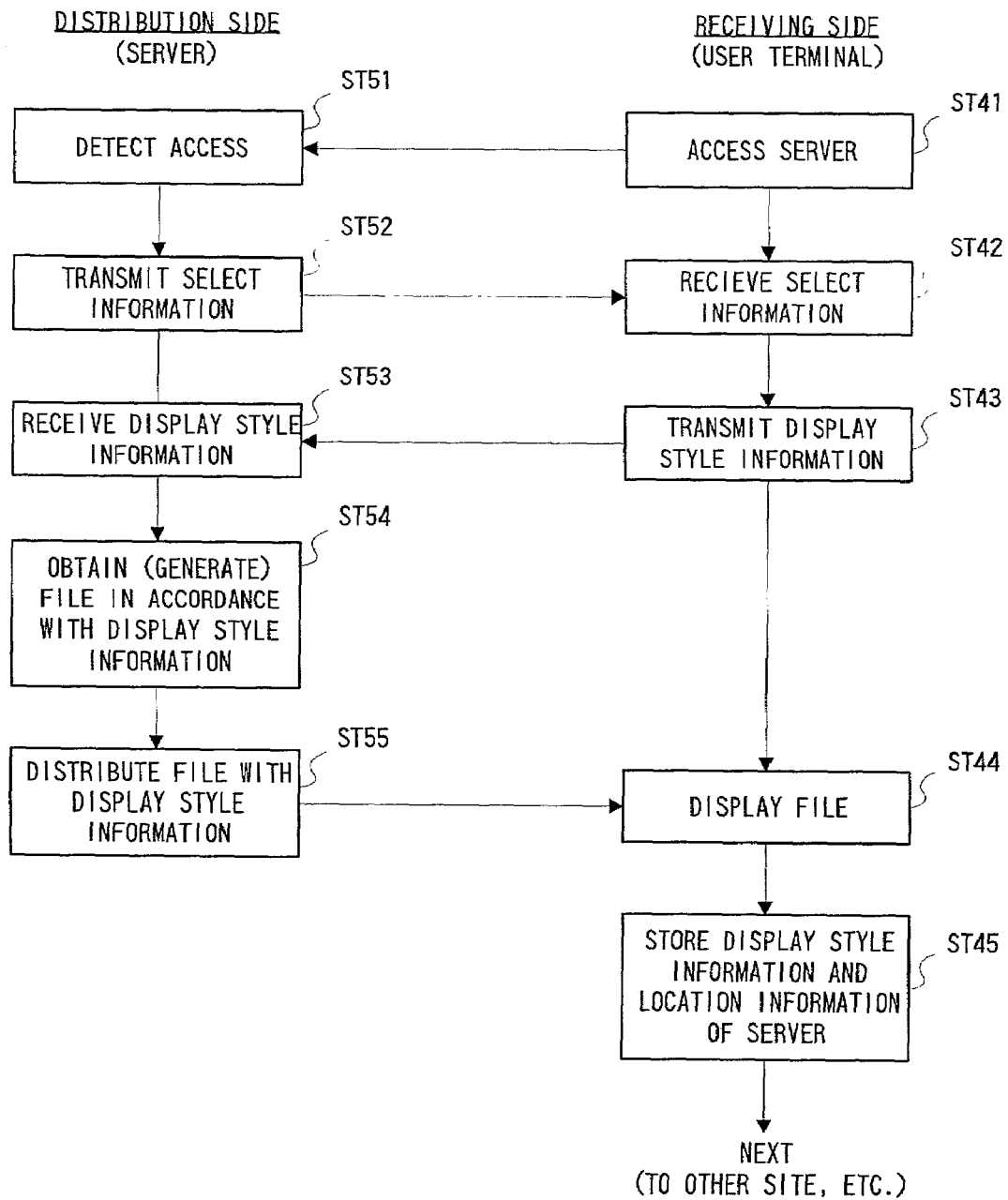
FIG. 9 is a flowchart showing an operation of a first time delivery of a second embodiment.

With reference to FIG. 9, on a first time delivery, a user inputs a URL of a homepage desired to browse in each of the user terminals (PC 2, game machine 3, portable terminal 4 or the like). Each of the user terminals 2-4 makes an access to the server 1 (ST41). The server 1 receives the access (ST51), and delivers select information to each of the user terminals 2 to 4 (ST52). The user terminal receives the select information and displays information related to the select information (ST42). The user specifies a type of the user terminal or a display style of a readable screen from the displayed select information, and the user terminal transmits the specified information as display style information to the server 1 (ST43). The server 1 receives the display style information from the user terminal (ST53). The server 1 selects (or generates) a file of a display style in accordance with the display style information (ST54). The server 1 transmits the file to the user terminal with the display style information (ST55). In this manner, the user terminal can receive the file of the desired display style and display the file on its display (ST44). Furthermore, on receiving the display style information, the user terminal stores the display style information and the URL in a memory of the user terminal (ST45)

Alternatively, each of the user terminals may stores the display style information in its memory on transmitting the display style information to the server 1 in ST43.

Figure 10:
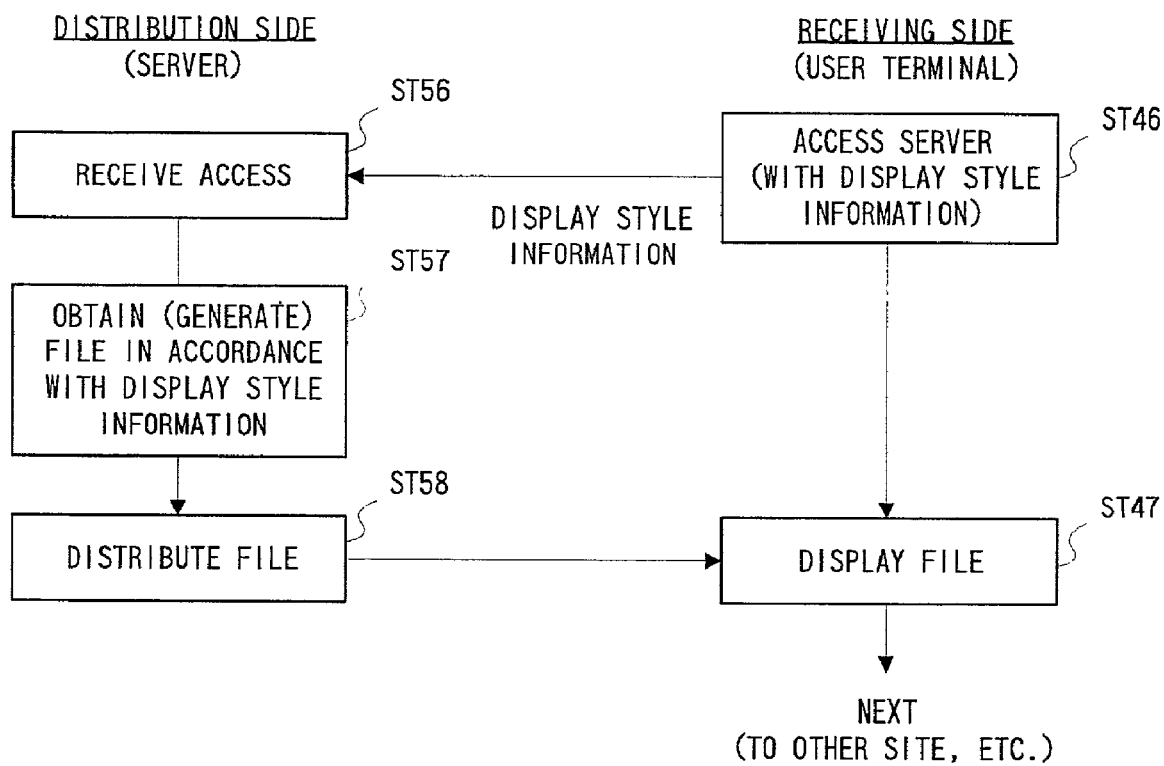
FIG. 10 is a flowchart showing operations of delivery at a second time and after in the second embodiment.

On deliveries at the second time and after, as shown in FIG. 10, when the URL of the homepage previously accessed is inputted in the user terminal, the user terminal makes an access to server 1 with the stored display style information automatically (ST46). When the server 1 receives an access request from the user terminal with the display style information, the server 1 selects (or generates) a file of a display style corresponding to the received display style information (ST57), and delivers the file to the user terminal (ST58). In this way, each of the user terminals 2 to 4 can receive to display the file of the desired display style from the server 1 (ST47). Since each of the user terminals 2 to 4 registers the display style information on the first time access, the user terminal can receive a file of the desired display style without again selecting the display style on accesses at the next time and after.

In the first embodiment, since the server 1 holds display style information for each user terminal, the server 1 needs a large storage capacity. On the other hand, in the second embodiment, since the server 1 does not need to store display style information for each user terminal, the necessary storage capacity is made smaller than that of the first embodiment. Moreover, the display style information is held on the user terminal side so that there is a merit that, when necessary, the user can optionally change the display style information without accessing the server 1.

If the display style information is standardized and is previously set in browsing software (browser) or a user terminal, the operation of receiving the select information from the server 1 becomes unnecessary. For example, previously registered are a type of a portable terminal, a type of color display or black-or-white display, a resolution of a terminal display unit, personal information of a user or the like in each of the user terminals. When the user accesses the server on a network by the user terminals 2 to 4, each of the user terminals automatically transmit the display style information regarding to the display style to the server 1. The server 1 recognizes the display style information while receiving an access request from the user terminal, and delivers a file of the display style desired by the user terminal to the user terminal. If the access request is not accompanied with the display style information, the server 1 delivers a file of a display style set as a default to each of the user terminals 2 to 4. In this manner, it is unnecessary that the display style information is independently specified for each site, so that it comes not to force the user to do excessive operations.

The present invention is designed to have a structure, in which unspecified users can use the system by connecting the user terminals and the server via the Internet. In the case of intending specified users, a network connection in another protocol by use of a line network or a network connection by use of a leased line is available.

As described above, an effect of the present invention is that all persons can equally obtain information, thus contributing to a realization of a barrier free society. The reason is that a file is delivered by changing a display style (presence or size of an image, display resolution and color) thereof in accordance with a situation of a receiving side (display function for terminals and viewers).

Another effect of the present invention is that information at higher levels can be delivered by further progress of receiving terminals. The reason is that information at higher levels can be delivered corresponding to graphics levels (resolution, 3D-graphics or the like) of the receiving terminals.

What is claimed is:

1. A file distribution system which distributes a file of a style in accordance with a request of each user terminal, comprising:
    a server connected to a network; and
    a plurality of user terminals accessible to said server via the network, each of said user terminals storing predetermined display style information in a memory before first accessing the server, the display style information being determined by a display function of each of said plurality of user terminals and specifying a display style of a file to be received from said server, the predetermined display style information corresponding one to one with a display type of each of said user terminals,
    wherein each of said user terminals transmits the predetermined display style information to said server automatically when each of said user terminals accesses said server; and
    said server includes a distributor which receives the display style information from each of said user terminals and distributes a file of a style in accordance with the display style information to each of said user terminals.

2. The file distribution system according to claim 1,
    wherein said server includes an identification number generator which gives an identification number to each of said user terminals on receiving the predetermined display style information from each of said user terminals, and a memory which stores the identification number and the display style information of each of said user terminals; and
    on receiving the identification number from each of said user terminals, said distributor obtains the predetermined display style information corresponding to the identification number from said memory and transmits a file of a style in accordance with the predetermined display style information to each of said user terminals.

3. The file distribution system according to claim 2,
    wherein each of said user terminals includes a user memory which stores the identification number given by said server and location information of said server; and
    when the user terminal accesses said server of which the location information is stored in said user memory, the user terminal transmits a corresponding identification number to said server.

4. The file distribution system according to claim 1,
    wherein said server includes a first server memory which previously stores a plurality of files having different display styles; and
    said distributor selects a corresponding file from the plurality of files stored in said first server memory in accordance with the predetermined display style information and distributes the file to a said user terminal.

5. The file distribution system according to claim 1,
    wherein said server further includes a second memory which holds an original file to be distributed to each of said user terminals and a converter which converts a style of the original file in accordance with the predetermined display style information; and
    the distributor distributes a file to the user terminal, the file having a style converted by the converter to a style specified by the predetermined display style information of a said user terminal.

6. The file distribution system according to claim 1, wherein the predetermined display style information is related to display information including a presence of an image, a size of an image and a size of a display screen.

7. The file distribution system according to claim 1, wherein the predetermined display style information includes information specifying a color combination or a display resolution.

8. A file distribution method for distributing a file of a style requested by a user terminal from a server to the user terminal via a network, the server being connected to a network, the method comprising the steps of:
    storing in said user terminal predetermined display style information which is determined by a display function of the user terminal and specifies a style of a file to be distributed from said server before first accessing said server, the predetermined display style information corresponding one to one with a display type of each of said user terminals, transmitting by said user terminal the predetermined display style information to said server automatically while said user terminal is accessing said server; and receiving by said user terminal from said server a file of a style in accordance with the predetermined display style information received from said user terminal by said server.

9. The file distribution method according to claim 8, said server generating an identification number and transmitting the identification number to said user terminal when said server receives a first access from said user terminal;

said server holding the predetermined display style information and the identification number in a memory;

said user terminal holding the identification number and location information of said server;

said user terminal transmitting the identification number to said server on accessing said server again;

said server obtaining the predetermined display style information corresponding to the identification number from said memory; and said server distributing a file of a style in accordance with the predetermined display style information obtained from said memory to said user terminal.

10. The file distribution method according to claim 8, wherein said server selects a file of a style in accordance with the predetermined display style information among a plurality of files previously prepared in a memory and distributes the file to said user terminal.

11. The file distribution method according to claim 8, wherein said server converts a file previously prepared into a file of a style in accordance with the predetermined display style information and distributes the file to said user terminal.

12. A file distribution method for distributing a file of a style requested by a user terminal from a server to the user terminal via a network, the method comprising, in order, the steps of:

storing in the user terminal predetermined display style information which is determined by a display function of the user terminal and specifies a display style of a file to be distributed from the server;

wherein the predetermined display style information corresponds one to one with a display type of each of said user terminals, transmitting by the user terminal the predetermined display style information to the server automatically before first accessing the server; and distributing by the server a file of a style in accordance with the predetermined display style information to the user terminal in response to an access from the user terminal.

* * * * *